Feb. 9, 1954     P. M. G. TOULON     2,668,939
COMMUTATION OF DISCHARGE TUBES, AND PARTICULARLY
OF RECTIFIERS AND INVERTERS
Filed Feb. 29, 1948     4 Sheets-Sheet 1

INVENTOR
PIERRE M. G. TOULON

BY

ATTORNEYS

Feb. 9, 1954   P. M. G. TOULON   2,668,939
COMMUTATION OF DISCHARGE TUBES, AND PARTICULARLY
OF RECTIFIERS AND INVERTERS
Filed Feb. 29, 1948   4 Sheets-Sheet 2
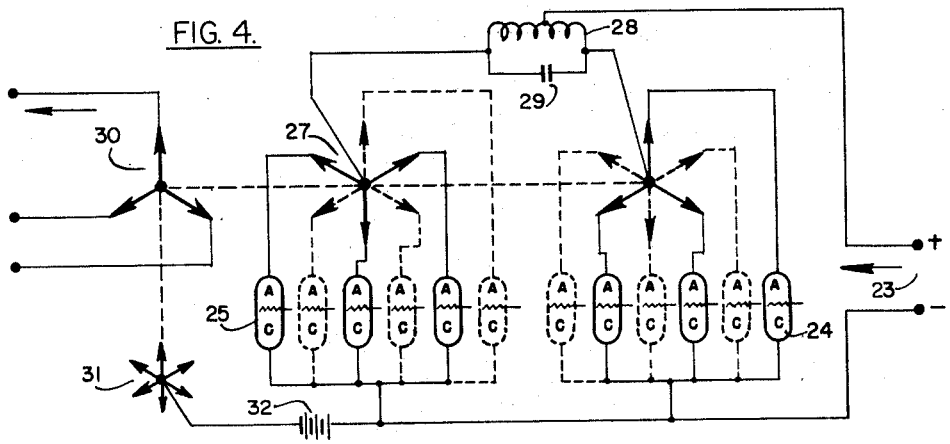
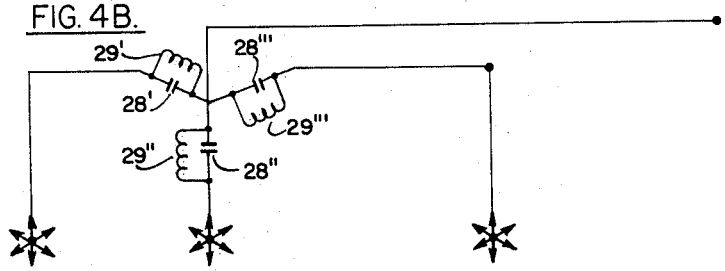
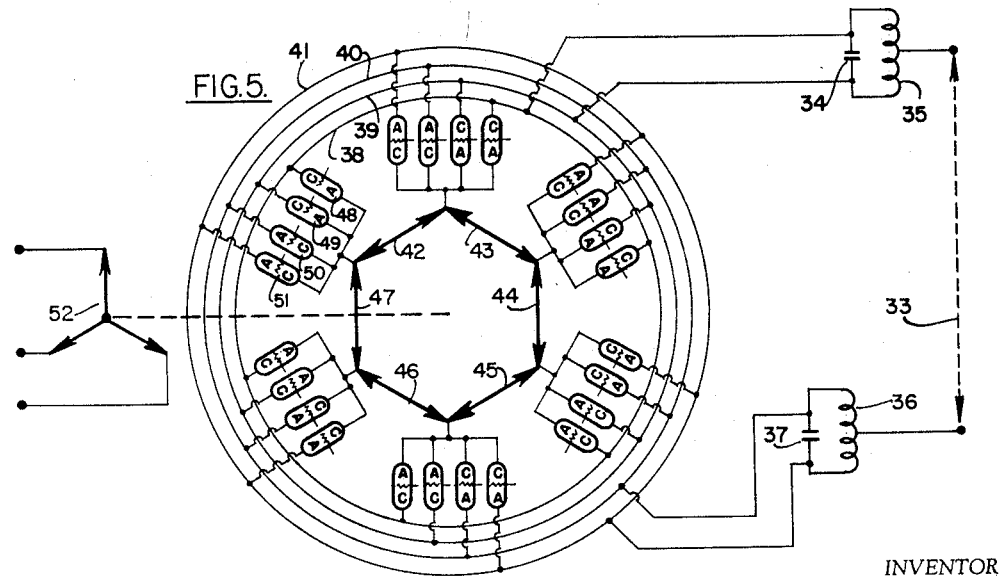
INVENTOR
PIERRE M. G. TOULON
BY
ATTORNEYS Feb. 9, 1954  P. M. G. TOULON  2,668,939
COMMUTATION OF DISCHARGE TUBES, AND PARTICULARLY
OF RECTIFIERS AND INVERTERS
Filed Feb. 29, 1948  4 Sheets-Sheet 3
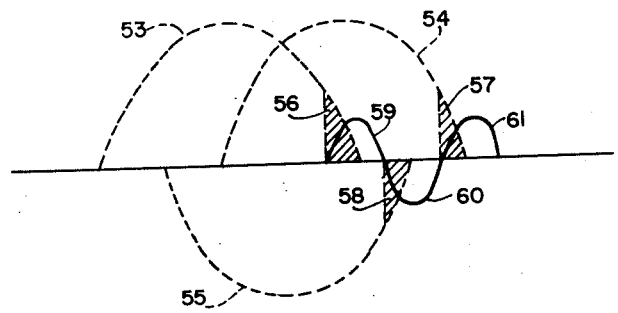
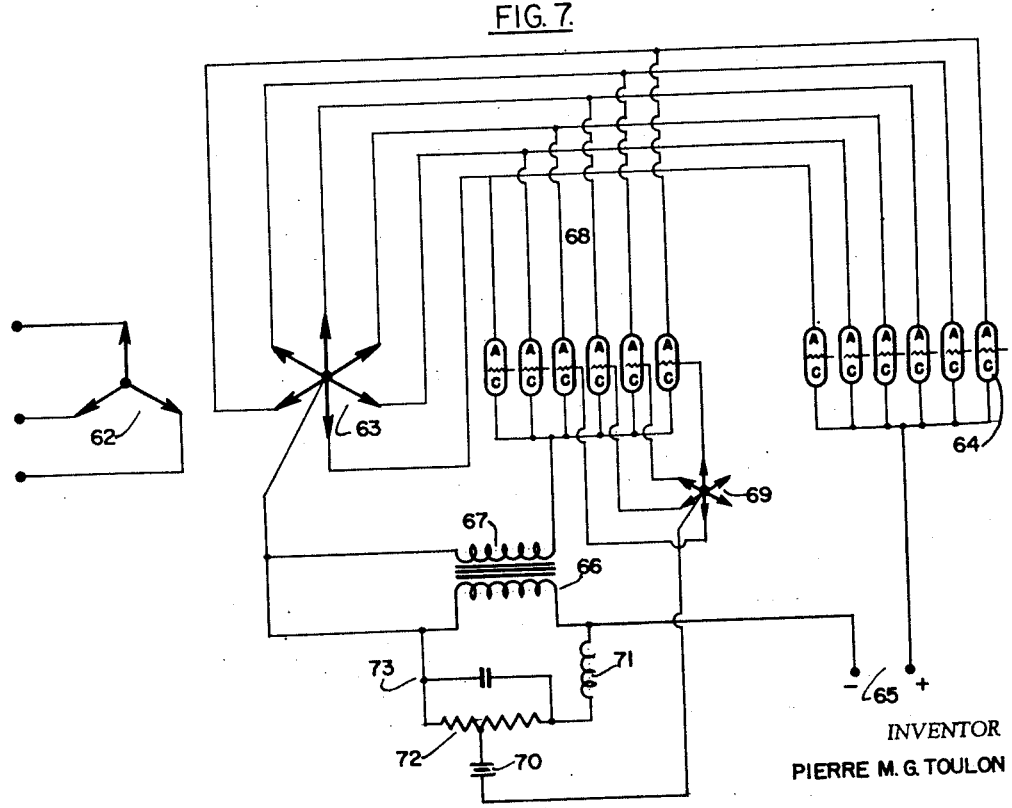
INVENTOR
PIERRE M. G. TOULON
BY  *Moore & Hall*
ATTORNEYS Feb. 9, 1954  P. M. G. TOULON  2,668,939
COMMUTATION OF DISCHARGE TUBES, AND PARTICULARLY
OF RECTIFIERS AND INVERTERS
Filed Feb. 29, 1948  4 Sheets-Sheet 4

INVENTOR
PIERRE M.G. TOULON

BY

ATTORNEYS

Patented Feb. 9, 1954

2,668,939

UNITED STATES PATENT OFFICE 2,668,939

COMMUTATION OF DISCHARGE TUBES AND PARTICULARLY OF RECTIFIERS AND INVERTERS

Pierre Marie Gabriel Toulon, Neuilly-sur-Seine, France, assignor, by direct and mesne assignments, of seventy-five per cent to Products & Licensing Corporation, New York, N. Y., a corporation of Delaware, and twenty-five per cent to Nelson Moore and William D. Hall, as joint tenants Application February 29, 1948, Serial No. 12,195

Claims priority, application France August 8, 1941

9 Claims. (Cl. 321—36)

The present invention covers a new process for generating, by means of discharge tubes, harmonics of a given fundamental frequency; and the use of these harmonics to insure the commutation between several tubes.

At the present time, numerous rectifying methods are known, using gaseous rectifiers, especially mercury vapor rectifiers. They are generally provided with control grids which permit delaying the lighting of the arc. These multiphase rectifiers, which can operate under high tension with excellent efficiency, have however the disadvantage that they generate, not only direct current, but also alternating current with periodic variations of the current which are multiples of the fundamental frequency (harmonics).

It is also known to employ gaseous rectifiers for transforming direct current into alternating current, such systems usually being called "inverters."

The difficulty in operating such devices resides in the interruption of the current in each tube at the desired time. This is generally accomplished by using an even number (or multiple) of tubes constituting two (or several) parallel branches. The tubes in each of these branches are identically connected. Each branch successively generates current and the changeover between the respective tubes of the different branches is obtained by means of induction coils and condensers.

This type of converter has several disadvantages: changeover is attained only under certain conditions, specifically at the moment of a sudden peak voltage. In the alternative circuit the changeover (that is the transfer of the arc from a tube of one of the groups to a tube of another group) may not occur. The result is a heavy short-circuit.

On the other hand, the condensers necessary to insure changeovers are very important and when a heavy load and high voltage are involved, the price of the necessary material is very high and the risk of accident by a "breakdown" of the condensers has to be considered.

The new circuit, which it is an object of the present invention to provide, permits generation of harmonics of the fundamental frequency in the (converter) network or the (inverter) circuit with an intensity proportional to the load. It permits reducing considerably the amplitude of the current modulations in rectifiers. In an "inverter-circuit" it permits effecting changeover without any risks of undesirable short-circuits, such as occur when the extinction of the arc of one of the groups does not take place at the desired moment.

The invention is characterized by the use of auxiliary discharge tubes, which generate harmonics in opposition to the ones generated by the rectifier, and in such a direction as to insure the commutation of the inverter.

In all the cases an alternating current distribution is arranged on one side and a direct current distribution on the other side, of the system.

According to the invention the first thing to do is to multiply the number of the phases of the alternating current distribution at the fundamental frequency, so as to create a distribution comprising a very large number of phases.

The invention consists in successively making use of each one of those many phases of the alternating current distribution at the fundamental frequency $f$ for generating harmonics at the frequency F, by making use of ionic tubes provided with control grids.

Each phase delivers current through a discharge tube in one of the primary windings of a transformer at the harmonic frequency F. The number of phases of the harmonic frequency F is a sub-multiple of the number of phases at the fundamental frequency $f$, and each phase of the harmonic frequency F is supplied, in turn, by one of the successive phases of the fundamental distribution $f$, through the corresponding tube, which comprises a cathode, one or several anodes and a control grid.

The grid of each tube is supplied with an alternating current voltage at the fundamental frequency $f$, the phase of which is very greatly shifted with regard to the phase of the voltage of the corresponding anode, so that the current flows only during a very short lapse of time; thus are created voltage impulses, successively, in the various phases of the transformer, at the harmonic frequency F.

A secondary winding is placed on the transformer of frequency F, and the harmonic current is used for effecting commutation at the frequency $f$, namely for producing a potential difference between the two groups composing the above described frequency changer.

A special alternate feature of the invention is that the grids of the discharge tubes are controlled in such a way that the amplitude of the harmonic current is a function of the load.

The harmonic current is preferably generated by means of auxiliary tubes called "commutation tubes" which are directly supplied from the alternating current mains through a transformer, of a suitable ratio, which feeds the current into the main circuit, and therefore insures either reduction of the harmonics (rectifier) or commutation (inverter).

Several circuit diagrams accompanying the following description, and relating to non-limitative examples, give a better understanding of the object and of the means of carrying out the invention in several particular cases.

Figures 1, 2, 3, 4, 4b show the present state of the art, exemplified in known circuits, that is: single rectifier (1), double rectifier (2), multiple inverter (2 groups) with single supply (3), single inverter with multiple feed (2 groups) (4), single inverter with multiple feed (3 groups) (4b).

Figure 5 is an improved variant representing a double inverter with multiple feed (2 groups).

Figure 6 represents, as a function of time, the commutation voltage attained by means of an arrangement in accordance with the invention.

Figure 7 shows an application of the invention to the reduction of harmonics generated in the rectifier of Figure 2.

Figure 1:
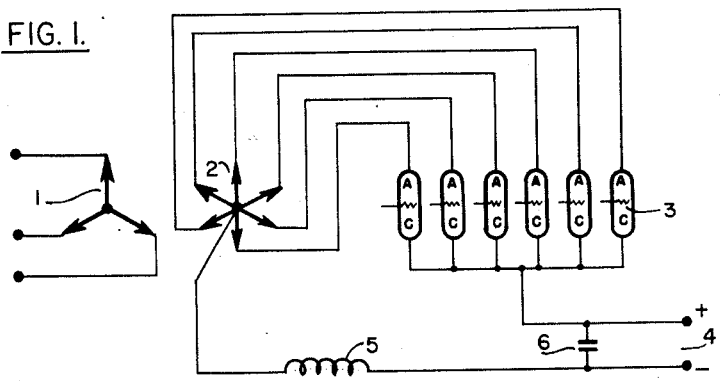

As represented in Figure 1, rarefied gas rectifiers (for instance mercury vapor) are of current use nowadays. They generally include a transformer with a primary winding 1, a secondary winding 2 (usually in star-connection, but to which is often added a supplementary polygonal winding connected with the star-shaped winding), and one or several tubes 3, with one cathode and several anodes. The direct current 4 is generally filtered by an induction coil 5 and a condenser 6. It is known that such a hexaphase rectifier produces undesirable modulations superimposed on the direct current, and consequently produces harmonics in the network, which, under certain conditions (when the induction coils of the transformers and the capacities of the lines are in resonance) may cause serious difficulties.

To cope with this difficulty, it has been proposed to multiply the number of phases of the secondary winding of the transformer, at the same time using a corresponding number of anodes. Thus, under certain conditions rectifiers or groups of rectifiers have been built which contain 48 or even 96 anodes. However such arrangements are very complicated and the multiplication of the "current output" is always a serious problem, especially if high voltages have to be applied. The use of electric filters, or of parallel resonant circuits, either in the current distribution or in the network, entails high expense, with little or no improvement. It is impossible to regulate the filter or the parallel resonant circuit in proportion to the harmonic current required by the commutation.

Figure 2:
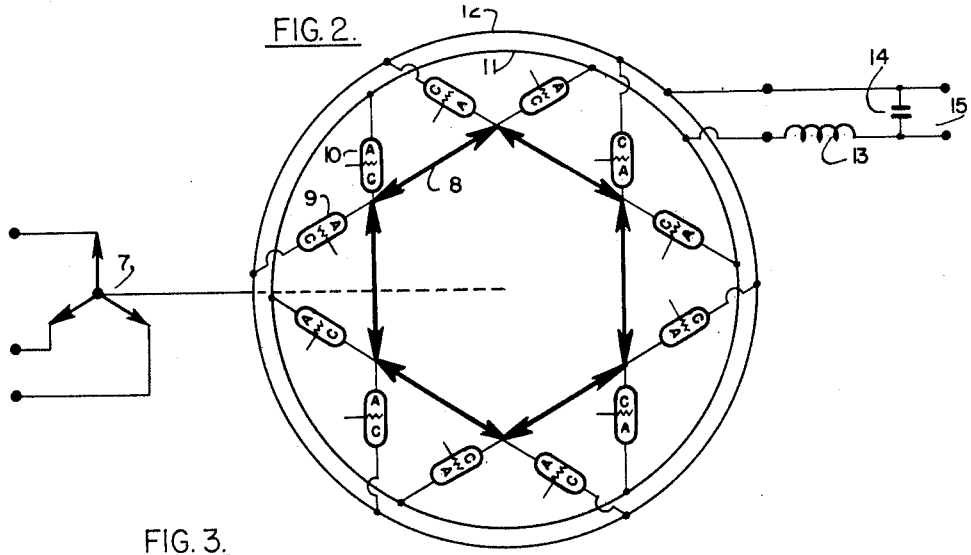

In order to avoid the multiplication of the current output and to better utilize the windings, it has been proposed, as shown on Figure 2, to use a polygonal winding and to avoid the neutral point by connecting two tubes in series. The potential drop in the two tubes in series does not present any difficulty if voltages of 10,000 volts and more have to be rectified; on the contrary the circuit problem is greatly simplified; the efficiency of the coil is higher and so is the insulation. In the circuit shown on Figure 2, the primary winding 7 is star-connected. The secondary winding 8 is a polygon. Two tubes are connected at each apex of the polygon, such as 9 and 10, one connected through the anode, the other through the cathode. The other electrode of each of the tubes 9 and 10 is connected to a pole, such as 11 and 12, of the direct current supply 15. The latter is generally filtered by means of the coil 13 and the capacity 14. To simplify the diagram, the wires 11 and 12 are represented in the shape of a circle surrounding the secondary windings 8 of the transformer. This mode however, is purely conventional.

We know that in this type of rectifier circuit, the mean intensity of the current output may be regulated by means of grids fed at the same frequency as the alternating current grid, the phase of which may be made variable at will.

In order to convert direct current into alternating current, that is, to design an inverter, it is necessary not only to be able to delay the striking of the arc in the tube, but also to extinguish the same. This is obtained only by interrupting, if only for a very short period of time, the current within the tube, and for that purpose a circuit in which an even (or multiple) number of independent tubes is used, has to be designed.

The anodes are connected in parallel, and an auxiliary voltage is used between the tubes in order to transfer the arc from one tube to the next one.

Figure 3:
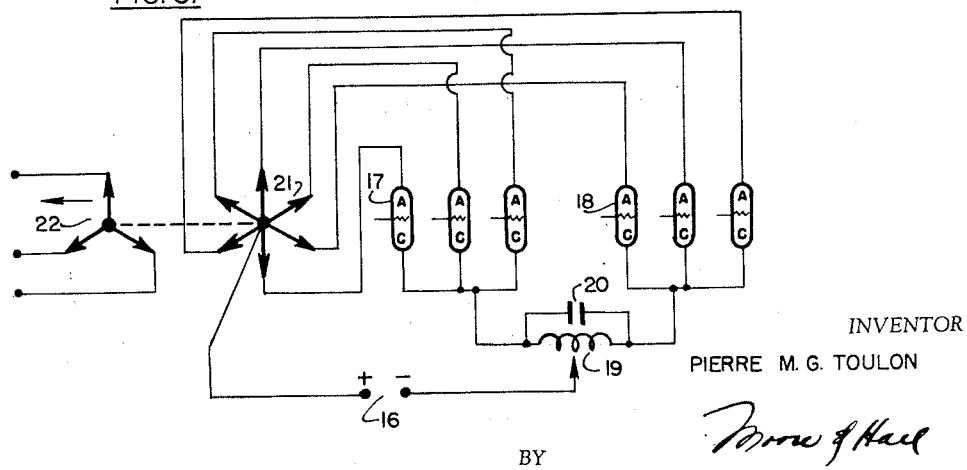

Figure 3 represents the classical circuit, in which one neutral point induction coil and one capacity are used to insure commutation.

In this figure, 16 represents the direct current supply, 17 a first group of tubes (sometimes it may be a single tube with several anodes), 18, another group of tubes (or single tube), 21, the primary winding of the transformer and 22 the secondary winding. The control grids are supplied by means of a device not included in the diagram. This device serves to effect the ignition of each tube at the desired moment, as well as to prevent ignition during the relatively long period in which the tube must not deliver current, so as to avoid a violent short circuit.

The commutation between groups 17 and 18 is obtained by means of a neutral point induction coil 19 and a condenser 20. The lighting of the arc in one of the tubes of either group causes the extinction of the arc in the previously lighted tube of the other group.

The changeover obtained with the help of the condenser 20 is, however, rather precarious; and in case of a sudden variation of the load, or for many other reasons, it may not take place at the right moment.

In Figure 4, the full lines represent a diagram in which the stars 26 and 27 have only three points. In the same figure, the dotted lines designate a second group of tubes, and a second distribution, which may be used in place of the first one, and also possesses the same properties. However, when this second group operates, the commutation voltage in circuit 28, 29 is in a reversed phase.

Then each of the two systems (full lines and dotted lines) must be used separately. They may operate simultaneously provided that two independent commutation circuits 28, 29 be used or else they must be wound oppositely on the same circuit.

In the following, and in order to simplify the figures, these two systems have been shown together in full line on the same diagram; but it is evident that, in order to control the direction of the current in the windings, certain windings must be split in halves.

The direction of the current may be reversed in all the tubes simultaneously without making the circuit inoperative. In most diagrams the respective positions of the cathodes and anodes can be reversed. In many cases however, it will be necessary to change the position of the grid transformers. Since the off-phase voltage applied to the control grid is to be modified with respect to the cathode, an insulation transformer may be necessary. Such insulation transformers have not been shown in the diagrams.

The oscillating circuit 28, 29 of Figure 4 is the commutation circuit similar to the circuit 19—20 of Figure 3. In both Figures 3 and 4, the circuit is single-phase. However this circuit may be worked out as polyphase, as shown in the Figure 4b. Instead of being divided up into two groups only, the tubes are distributed between several groups, for instance three groups, each group being fed through an induction coil (such as 28', 28'', 28'''). A capacity, (such as 29', 29'', 29'''), allows the commutation to take place.

The explanation given above with regard to the rectifier of Figure 2 (poor efficiency and difficult construction of the star-shaped winding) also applies to the inverter.

Figure 5 shows an improved inverter using two tubes in series, and thus permitting the use of a polygonal transformer winding. To each one of the apexes of the polygonal winding 42, 43, 44, 45, 46, 47 are connected, in each group of 4 tubes such as 48, 49, 50, 51, 2 anodes and 2 cathodes, and the same tubes have their other electrodes connected to independent wires 38, 39, 40, 41, represented in Figure 5 in the shape of circles for the sake of simplicity. The commutation inductor of the first two tubes, 48 and 49, of each group is shown at 34, and the corresponding commutation capacity at 35. Similarly the commutation inductor of the two second tubes, 50 and 51, of each group is shown at 36 and the corresponding commutation capacity at 37. The direct current supply (33) is transformed into an alternating current (52) by means of a suitable choice of the voltages applied to the control grids of the various tubes.

Instead of using a single-phase or a di-phase induction coil to obtain the commutation voltage a 3 (or more) branch induction coil can be used, as shown in Figure 4b, each branch feeding an independent group of tubes. The commutation is facilitated and short circuits are more easily avoided, due to the use of polyphase coils.

In spite of these improved circuits it still occurs that, under certain conditions, the commutation which is only insured by the addition of the condenser at the terminals of the coil may be defective, causing serious trouble.

According to this invention, we generate artificially an A. C. commutation voltage (for undulators) or an A. C. compensation voltage (for rectifiers) both of the proper frequency and phase. The amplitude of this auxiliary commutation voltage is automatically chosen as a function of the current intensity.

For that purpose an auxiliary device comprising discharge tubes is used, the grids of which are suitably fed with an out-of phase voltage in regard to the anode voltage.

Figure 6 shows, against a time base, the shape of the secondary intensity created by the auxiliary commutation device, and enables easy understanding of the advantages of the device. On this figure are represented, in dotted lines, at 53 and 54, the form of the voltage applied to the anodes of this auxiliary system of commutation (in one of the groups). Also shown, but in reverse, is the form of voltage 55 applied to the anodes of the other group. The voltage applied to the grids of this auxiliary device is almost 90° de-phased from the voltage applied to the corresponding anode. If under these conditions each anode sends current through a pure ohmic resistance, the current would have the form represented by the hatched portion such as 56, 58 and 57. But since each anode feeds into a coil, the current has, in reality, the form represented in 59, 60 and 61. This voltage has a frequency that is a multiple of the frequency of the alternating current received (or to be produced), the ratio between these two frequencies being precisely equal to the number of "anodes" of the rectifier, the harmonics of which are to be suppressed, and equal to half the one of the undulator to be used. By varying the amplitude or the phase of the alternating current (or else the initial basic polarization) which feeds the grids of these auxiliary commutation tubes, it is easy to vary the amplitude of the current intensity and thence to apply it according to needs, either for the suppression of the rectifier harmonics, or the creation of a commutation frequency (necessary to the good functioning of the undulator).

Figure 7 shows the application of the invention to reduction of the harmonics created by a hexaphase rectifier. In this figure, the supply transformer primary is shown at 62; and at 63, the star-shaped secondary (6 branches) which feeds the main rectifier 64. The direct current 65 is fed through a transformer winding 66.

According to the invention, an auxiliary group of tubes generates a harmonic potential in the winding 66, of an amplitude and frequency equal to the one supplied by rectifier 64, but of opposite phase.

For that purpose two groups of six tubes 68 are used in order to generate harmonics, in the primary of transformer 67, the secondary of which is connected in series with the direct current 65.

The voltage applied to the control grids of the tubes 68 is almost 90° out of phase with respect to the voltage applied to the anodes, so that an anodic current is delivered only for a very short period of time during the cycle, as shown, in Figure 6, by the hatched portion of the curve 56.

Very strong harmonics of the main current are generated in the transformer 67, due to the group of tubes 68.

The invention moreover, affords means for adjusting the amplitude of the harmonic current with respect to the amplitude of the main current supply, in such a way that the compensation of the harmonics is obtained regardless of operating conditions. According to Figure 7, this result may be obtained by measuring the voltage drop in the winding 66 and by proportionately controlling the amplitude or the "dephasing" of the grids of the tubes 68.

In Figure 7, the induction coil 71 and the capacity 73 enable obtaining a voltage drop in the potentiometer 72 (adjustable by means of the slider on this potentiometer) and proportional to the mean intensity of the direct current.

This voltage is used in order to vary the initial polarization of the voltage applied to the grids of the tubes 68. For this purpose, the neutral point of the grid transformer 69 is connected to the slider of the potentiometer 72 and, if necessary, a suitable initial biasing battery 70 is added.

Figure 8:
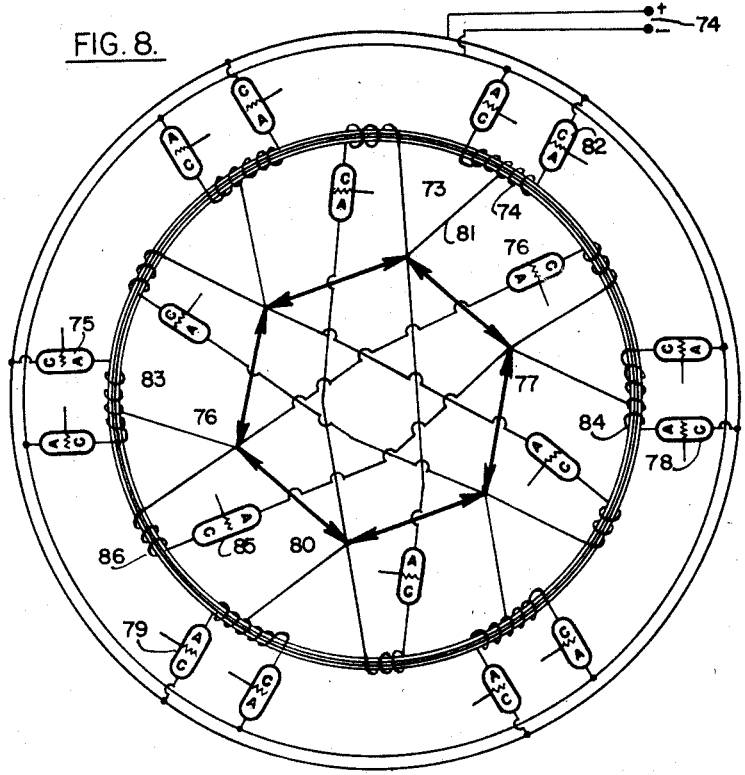
Figure 8 illustrates an application of the invention to a twin rectifier arranged, according to Figure 2, the purpose of which is to reduce harmonics.

Figure 8 shows, as an example, an arrangement of commutation tubes which can be fed by an alternating polygonal distribution.

The circuit is an application of the rectifier shown in Figure 2, comprising a polygonal supply winding and two tubes in series.

The direct current 74 is supplied by two tubes in series. At a given time, for instance, the current passes through tube 75, through the apex 76 of the polygonal winding, through 77, and through tube 78. A short time later ($\frac{1}{300}$ second), tube 79, apex 80, apex 81 and tube 82 serve this purpose.

According to the invention, each tube is connected to the direct current through a transformer winding, in which harmonic voltage is induced, which regulates the direct current and at the same time suppresses the "harmonics" transmitted in the network.

In this figure, the tube 75 is connected with the apex 76 through the winding 83. Likewise the tube 78 is connected to the apex 77 through the winding 84.

A similar arrangement is applied to each wire connecting each tube.

All the windings such as 83, 84, i. e. through which a current of common frequency passes, can be interconnected around a common magnetic circuit. In Figure 8, this common magnetic circuit is represented by a circle around the polygon, but it is to be understood that this is only to simplify the reading of the diagram and that the arrangement of the coils can vary at will. Instead of placing all the windings on a single core, 3 or 6 different cores may be used, so as to increase the mutual induction between the coils. According to the invention, the harmonic frequency to be induced in those windings is created by means of a system of auxiliary tubes, the grids of which are suitably dephased so that the output does not last more than a fraction of a cycle. In Figure 8 these tubes are shown in 85. Each one of them feeds a coil 86 connected to the magnetic core.

The direction of the coils (such as 86) and the supply phase of the control grids of the tubes (such as 85) are chosen in such a way that the harmonic current generated is of the same value but of a direction opposed to the one supplied by the direct current.

As already explained, the importance of this invention, already obvious as applied to rectifier circuits, since it permits the reduction of the harmonics in the network, is increased in the case of inverters, since it insures their commutation without risk of failure.

Figure 9:
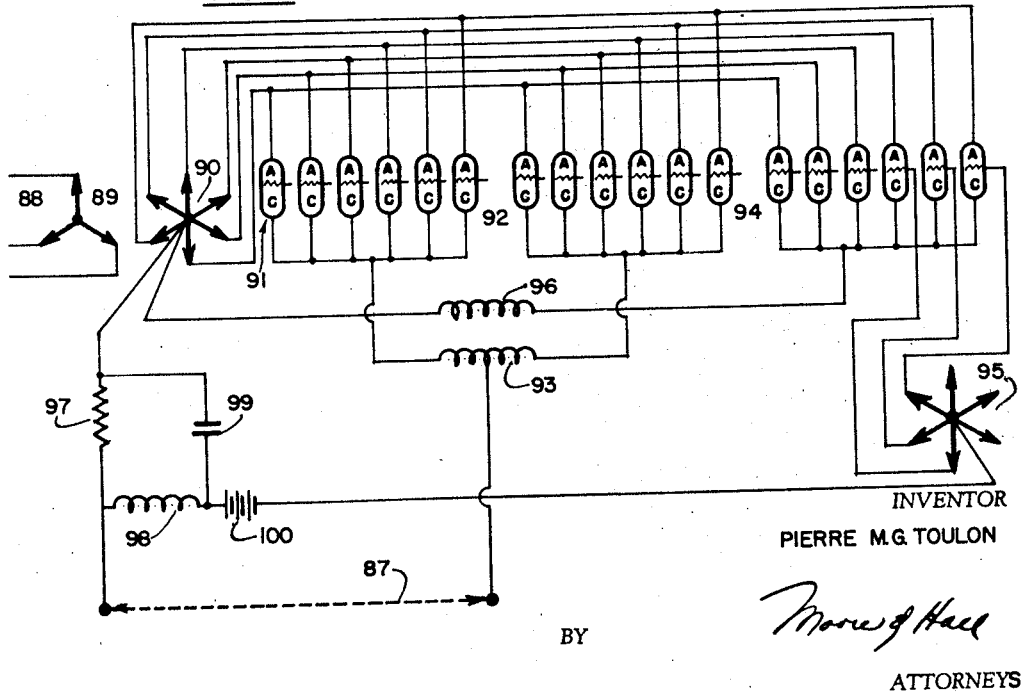
Figure 9 is an application of the invention to an inverter arranged according to Figure 3, and insures perfect commutation, whatever the load applied to the distribution of alternating current, suppressing all risk of short-circuit between the inverter tubes.

In Figure 9, an inverted has been shown consisting of a single series connected tube (as in Figure 1) and a single phase harmonic distribution. But it is clear that the invention also applies to the case where several tubes in series are used (as in Figure 2) as well as in the case where the harmonic distribution is a polyphase one (as in Figure 4b), that is, several groups of independent tubes being used, all of which work in turn.

In Figure 9, 87 designates the direct current energy supply for the inverter, and 88 the alternating current resulting from its transformation by the machine.

The transformer comprises a star-shaped primary winding 90, hexaphase, for instance, and a three-phase secondary winding 89 (this case corresponding to the diagram of Figure 3).

Two groups of independent tubes, 91 and 92, the anodes of which are connected respectively to phases of even and odd ranks respectively are used for the conversion of energy. As usually done, these tubes are connected to the direct current supply through a neutral point induction coil 93, but instead of connecting as usual a condenser to the coil terminals to insure commutation (such as condenser 26 of Figure 3 for instance) the frequency of commutation is systematically generated, with the intensity and the desired phase, by means of a group of tubes 94, the electrodes of which are connected directly to the terminals of a star-shaped winding 90 (or else fed by an auxiliary transformer connected to the network).

The grids of tubes 94 are fed, almost in quadrature, by means of a transformer 95, in such a way that the current fed in the various tubes lasts a very short time, and that the current circulating in the coil 96, in series with all these tubes (connected in parallel), has a frequency which is a multiple of the one of the network (the said frequency depending on the number of the anodes 91 or on the phases of the transformer 90).

According to the invention, the intensity of this harmonic current is made proportional to the load, that is to the intensity of the supplying current. For this purpose, a rheostat 97 is used, in which a voltage drop is produced, proportional to the intensity. A coil 98 and a capacity 99 suppress the rapid variations of the current. The voltage taken from the rheostat and suitably adjusted (by means of a battery 100) permits the variation of the grid bias (neutral point of transformer 95) proportionally to the load, and then creation of an harmonic current, the intensity of which depends on the load of the inverter.

What I claim is:

1. In a system for the generation of alternating current at frequency F which is a multiple of the frequency $f$ of a supply network, by means of gaseous conduction tubes having control electrodes, the combination comprising, a first network supplying voltage at frequency $f$, a multiphase network having an even number of phases equal to the product of two integers, means for supplying said multiphase network with current from said first network at frequency $f$, means for supplying to each of the phases of said multiphase network alternating voltage at frequency F, means for connecting in series with each phase of said first network one of said gaseous conduction tubes having a control electrode, means for applying to the control electrode of each of said last mentioned tubes a voltage at frequency $f$ which is de-phased from the anode voltage of that tube sufficiently to assure that firing of that tube will occur during times equal to or less than $$\frac{1}{2F}$$

seconds.

2. In a system for the conversion of current, a static transformer for supplying alternating current at frequency $f$, said static transformer having multiphased primary windings, two groups of gaseous conduction devices, means for connecting one device from each of said groups in series with each of said primary windings, means for initiating discharge in succession in alternate ones of said groups of gaseous conduction devices and in phase sequence in each of said groups, a further static transformer operable at frequency F and having a secondary winding connecting said two groups of gaseous conduction devices and having a primary winding connected in series with a further group of gaseous conduction devices having anodes and control electrodes, means for connecting said anodes to said first mentioned transformer for supplying to said anodes mutually de-phased voltages at frequency $f$, and means for supplying to said control electrodes further voltages at frequency $f$ which are de-phased at each of said further group of gaseous conduction devices sufficiently to effect firing of each of said further gaseous conduction devices for a time equal to $$\frac{1}{2F}$$

seconds.

3. In a frequency multiplier, a source of three phase currents of frequency $f$, means responsive to said three phase currents for generating six phase currents, means for deriving from each of said six phase currents alternately oppositely poled pulses occurring substantially only just prior to passage of said each of said six phase currents through zero value, and means responsive to said pulses for providing a current of frequency $3f$.

4. In a frequency multiplier, a source of polyphase currents of $f$ phases, means responsive to said polyphase currents for generating further polyphase currents of F phases, where $F-Nf$, and F is an even number, and where N is an integer, means for deriving from each of said further polyphase currents pulses occurring substantially only when said each of said further polyphase currents passes through zero value, and means responsive to said pulses for providing a current of frequency F.

5. In a frequency multiplier, a source of currents havings phases separated by $\theta$ degrees and a predetermined frequency $f$, means responsive to said currents for generating further currents separated by $$\frac{\theta}{N}$$

degrees, when N is an integer, means responsive to each of said latter currents for generating pulses substantially only just prior to passage of said each of said latter currents through zero, and means responsive to said pulses for providing a current of frequency $Nf$.

6. In a frequency multiplier, means comprising a static polyphase transformer having an input winding of N phases and an output winding of $aN$ phases, where both $a$ and N are integers and $a$ is greater than unity, $aN$ gaseous conduction devices, means for connecting each of said $aN$ gaseous conduction devices to pass current in response to voltage in a different one of said $aN$ phases, and means for controlling each of said gaseous conduction devices to pass only short pulses of current, and a common load circuit for combining said pulses of current.

7. In an inverter, a source of D.-C. voltage, a multiphase line having 2N phases, where N is an integer, an inductance having a center tap and two end terminals, 2N gaseous conduction devices connected each between one of said phases and one of said end terminals, further 2N gaseous conduction devices connected each between one of said phases and the other end terminal of said inductance, a 2N phase transformer primary winding having a neutral point, means for connecting the phases of said 2N phase transformer primary each to one of the phases of said multiphase line, means for connecting said source of D.-C. voltage between said neutral point and said center tap, a further inductance, means comprising a separate gaseous conduction device connected between each phase of said multiphase line and said neutral point in series with said further inductance, means for firing said last named gaseous conduction devices in phase sequence in response to current flow in said phases of said 2N phase transformer primary to provide current in said further inductance at a multiple of the frequency of current flow in said 2N phase transformer primary, and means for coupling said first mentioned inductance and said further inductance to induce therein voltage at said multiple of the frequency of current flow in said 2N phase transformer primary.

8. In a rectifier of polyphase currents of frequency $f$, and N phase source of voltage, an N phase primary winding connected to said N phase source of voltage, a 2N phase secondary winding having a neutral point magnetically coupled with said N phase primary winding, a load, a gaseous conduction rectifier valve connected between each phase of said 2N phase secondary winding and said neutral point in series with said load, whereby harmonics at frequency $2Nf$ are present in said load, means for reducing said harmonics comprising a simple secondary winding in series with said load, and means for inducing in said single secondary winding harmonic voltages of compensating phase, said last means comprising a single primary winding coupled with said single secondary winding and 2N further gaseous conduction devices connected respectively between the phases of said 2N phase secondary winding and said neutral point in series with said single primary winding, and means for firing said 2N further gaseous conduction devices in phase sequence and each over a small phase angle.

9. In an inverter, a three phase load, a D.-C. source, a three phase transformer secondary connected to said three phase load, a six phase transformer primary coupled to said transformer secondary and having a neutral point, an inductance having a center tap, a first group of six ionic tubes having anodes connected respectively to the phases of said six phase transformer primary and their cathodes connected together, a second group of six ionic tubes having their anodes connected respectively to the phases of said six phase transformer and their cathodes connected together, means for connecting the cathodes of said first group and said second group respectively to opposite ends of said inductance, means for connecting said D.-C. source between said neutral point and said center tap, a group of six auxiliary ionic tubes, means connecting said auxiliary ionic tubes respectively between said six phases and said neutral point, and means responsive to current flow in said auxiliary ionic tubes for inducing A.-C. commutating voltage in said inductance for application in opposite phase respectively to the cathodes of said first and second groups of ionic tubes.

PIERRE MARIE GABRIEL TOULON.

References Cited in the file of this patent

UNITED STATES PATENTS

| Number | Name | Date |
| --- | --- | --- |
| 1,480,722 | Hellmund | Jan. 15, 1924 |
| 1,929,721 | Willis | Oct. 10, 1933 |
| 1,929,723 | Willis | Oct. 10, 1933 |
| 2,008,515 | Plathner et al. | July 16, 1935 |
| 2,026,358 | Petersen | Dec. 31, 1935 |
| 2,031,582 | Alm | Feb. 25, 1936 |
| 2,041,302 | Seyfert | May 19, 1936 |
| 2,071,189 | Willis | Feb. 16, 1937 |
| 2,225,341 | Herskind | Dec. 17, 1940 |
| 2,327,971 | Slepian | Aug. 24, 1943 |